C. C. THOEN.
CHURN FILLING APPARATUS.
APPLICATION FILED APR. 11, 1918.
1,289,302.
Patented Dec. 31, 1918.
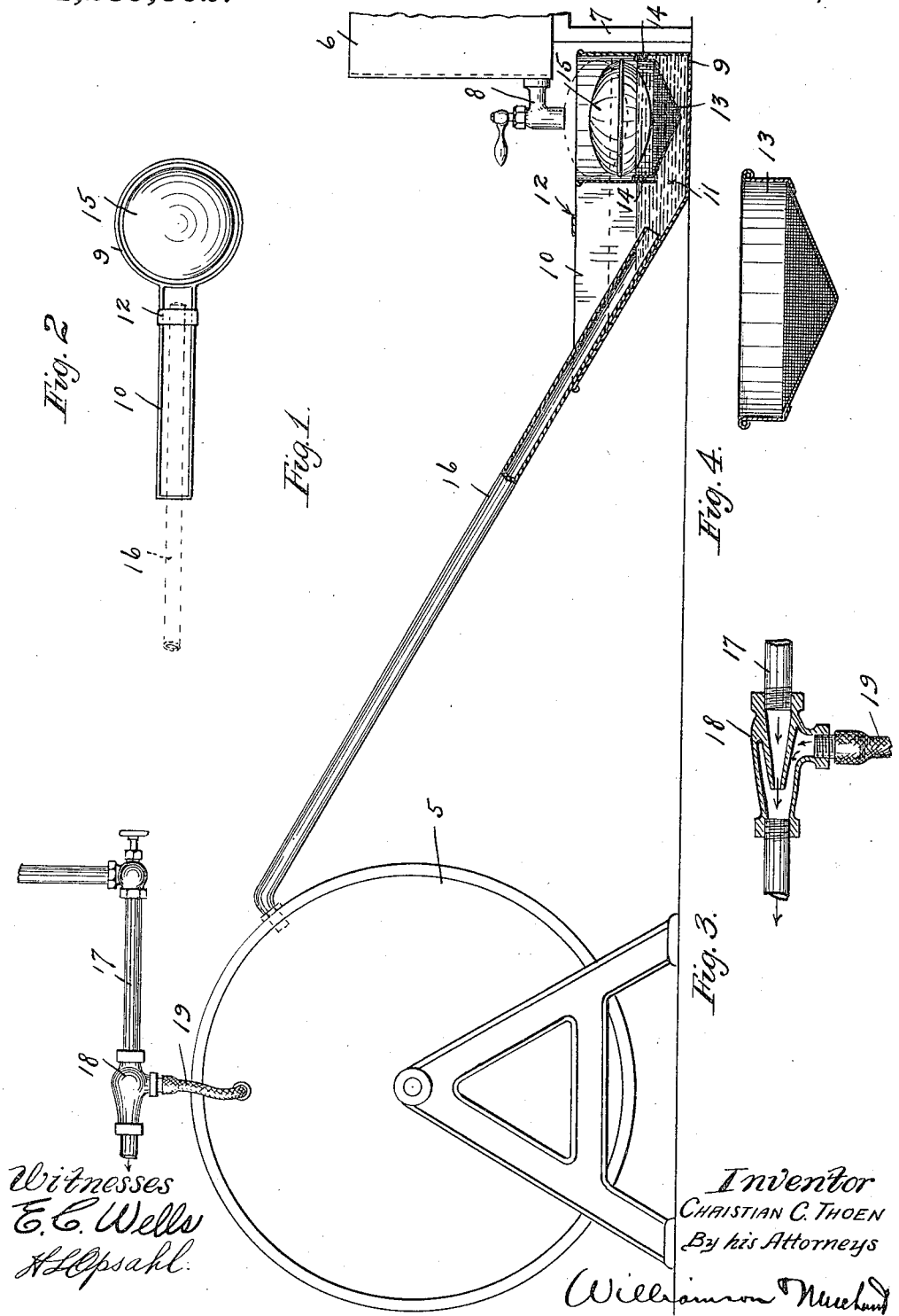
Inventor
CHRISTIAN C. THOEN
By his Attorneys

UNITED STATES PATENT OFFICE.

CHRISTIAN C. THOEN, OF CYRUS, MINNESOTA.

CHURN-FILLING APPARATUS.

1,289,302.

Specification of Letters Patent.　　Patented Dec. 31, 1918.

Application filed April 11, 1918.　Serial No. 228,017.

*To all whom it may concern:*

Be it known that I, CHRISTIAN C. THOEN, a citizen of the United States, residing at Cyrus, in the county of Pope and State of Minnesota, have invented certain new and useful Improvements in Churn-Filling Apparatus; and I do hereby declare the following to be a full, clear, and exact description of the invention, such as will enable others skilled in the art to which it appertains to make and use the same.

My invention relates to improvements in churn filling apparatus; and to this end, generally stated, it consists of the novel devices and combinations of devices hereinafter described and defined in the claim.

In the accompanying drawings, which illustrate the invention, like characters indicate like parts throughout the several views.

Referring to the drawings:

Figure 1 is a view partly in elevation and partly in central vertical section, illustrating the apparatus arranged to fill a churn from a cream vat;

Fig. 2 is a plan view of the filling receptacle and receiving end portion of the filling tube, said filling tube being illustrated by means of broken lines;

Fig. 3 is a detail view illustrating the siphon provided for producing a partial vacuum in the churn; and Fig. 4 is a view of the strainer in central vertical section, on an enlarged scale.

The numeral 5 indicates a churn, and the numeral 6 indicates a cream vat, supported on legs 7, and having a discharge faucet 8. Removably supported on the floor, under the faucet 8, is an open filling receptacle or pail 9, having a long discharge spout 10, with a hopper-like bottom, that extends to the bottom of said pail. This spout 10 is relatively narrow and entirely cut off from the pail 9, except for a communicating passageway 11, located at the bottom of said pail. A hand piece 12, on the spout 10, affords means by which the pail 9 may be carried.

A strainer 13, with an inverted conical bottom, is mounted in the pail 9, above the passageway 11, and removably supported on an annular shoulder 14, formed with the internal wall of said pail. The extreme lower end of the strainer 13 is spaced above the bottom of the pail 9, so that the contents therein will completely drain into the lower extremity of the pail. Placed in the pail 9, above the strainer 13, is a removable and reversible valve acting float 15, of such diameter as to have very little horizontal movement in said pail, thus keeping the same properly positioned. When the cream discharged from the vat 6, through the faucet 8, into the pail 9, has risen to substantially a predetermined level in said pail, the float 15 engages the discharge end of the faucet 8, and thereby restricts or cuts off the flow of cream from the vat 6.

The cream, after passing through the strainer 13, is conveyed to the churn 5 through a supply pipe 16. This supply pipe 16 has its receiving end portion loosely supported on the bottom of the spout 10, and its open receiving end is below the cream level. The delivery end of the pipe 16 is connected to and arranged to discharge into the churn 5. To cause a flow of cream from the pail 9 through the pipe 16, and into the churn 5, a partial vacuum is produced in said churn by the commonly used method of blowing steam, from a suitable source of supply, through a valve-equipped pipe 17, having interposed therein an ejector 18, connected to the interior of the churn 5 by a short hose 19. The receiving end of the hose 19 is extended through an aperture provided therefor in one of the heads of the churn, and can readily be detached therefrom.

To fill the churn 5 with cream from the vat 6, the faucet 8 is opened to allow the cream in the vat to flow into the pail 9. At the same time steam is blown through the ejector 18 to produce a partial vacuum in the churn 5, and thereby cause a flow of cream from the spout 10, through the pipe 16, and into said churn. In case the cream is not removed from the pail 9, through the pipe 16, as fast as the same is delivered thereto through the faucet 8, from the vat 6, the valve acting float 15 will rise with the accumulation of cream in said pail and thereby restrict or cut off the supply of cream to the faucet 8 until the level again drops, thus carrying said float away from the faucet 8.

After the apparatus is once started the attendant can go about other work, and the apparatus will need no further attention until the churn is filled for the reason that the flow of cream from the vat 6 is automatically controlled by the valve acting float, and thereby eliminates any danger of the cream overflowing from the pail 9 and spout 10. When the cream has been reduced to a level below the receiving end of the pipe 16, air will be drawn into said pipe, thus producing a sucking noise, by which the attendant will know that the pail 9 is substantially empty and the churn filled. The pipe 16 and hose 19 may be detached from the churn and spout 10, and any cream remaining in the pail 9 may be poured therefrom through the spout 10, into the vat 6, or other receptacle. By making the strainer 13, float 15, and pipe 16 removable from the pail 9, the cleansing of the apparatus is greatly facilitated. As both sides or faces of the float 15 are alike, said float can be placed in the pail 9 either side up.

The above described apparatus has, in actual usage, proven highly efficient for the purpose had in view.

What I claim is:

The combination with a supply vat having a discharge port, a receiving receptacle, and means for producing a partial vacuum in the receiving receptacle, of an open filling receptacle, having a hopper-like spout with a communicating passageway leading to the lower extremity of the filling receptacle, a valve acting float in the filling receptacle, arranged to close the discharge port in the supply vat to prevent an overflow from the filling receptacle, and a filling pipe leading to the receiving receptacle and having its receiving end loosely supported in the spout of the filling receptacle.

In testimony whereof I affix my signature in presence of two witnesses.

CHRISTIAN C. THOEN.

Witnesses:
O. E. BJORGAARD,
N. I. HATLING.

Copies of this patent may be obtained for five cents each, by addressing the "Commissioner of Patents, Washington, D. C."